US010289364B2

United States Patent
Inoue

(10) Patent No.: US 10,289,364 B2
(45) Date of Patent: May 14, 2019

(54) INFORMATION PROCESSING APPARATUS, METHOD, AND NON-TRANSITORY COMPUTER-READABLE STORAGE MEDIUM STORING PROGRAM

(71) Applicant: Takumi Inoue, Kawasaki (JP)

(72) Inventor: Takumi Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/672,683

(22) Filed: Aug. 9, 2017

(65) Prior Publication Data

US 2019/0050183 A1 Feb. 14, 2019

(30) Foreign Application Priority Data

Aug. 18, 2016 (JP) .................................. 2016-160689

(51) Int. Cl.
*G06F 3/12* (2006.01)
*H04N 1/00* (2006.01)

(52) U.S. Cl.
CPC .......... *G06F 3/1254* (2013.01); *G06F 3/1203* (2013.01); *G06F 3/1236* (2013.01); *G06F 3/1284* (2013.01); *H04N 1/00411* (2013.01)

(58) Field of Classification Search
CPC .... G06F 3/1254; G06F 3/1203; G06F 3/1236; G06F 3/1284; H04N 1/00411
USPC ........................................................ 358/1.15
See application file for complete search history.

(56) References Cited

U.S. PATENT DOCUMENTS

| 2013/0208298 | A1* | 8/2013 | Morimoto | ............. | G06F 3/1209 |
| | | | | | 358/1.14 |
| 2013/0222829 | A1* | 8/2013 | Nakashima | ........... | G06F 3/1204 |
| | | | | | 358/1.13 |
| 2015/0015910 | A1* | 1/2015 | Mitsui | ................ | G06K 15/4095 |
| | | | | | 358/1.14 |

FOREIGN PATENT DOCUMENTS

JP  2013-168017 A  8/2013

* cited by examiner

*Primary Examiner* — Neil R McLean
(74) *Attorney, Agent, or Firm* — Fitzpatrick, Cella, Harper & Scinto

(57) ABSTRACT

In an application, an instruction to execute a function is set in a Print Ticket and a printer driver is called via an OS. In the printer driver, the Print Ticket is obtained from the OS, and the function is executed based on the instruction set in the obtained Print Ticket.

13 Claims, 18 Drawing Sheets

FIG. 8

```
<?xml version="1.0" encoding="UTF-8"?>
<psf:PrintTicket xmlns:psk="http://schemas...." xmlns:ns0000="http://www..." version="1" xmlns:xsd="http://www..."
xmlns:xsi="http://www..." xmlns:psf="http://schemas....">
<!-->
-<psf:ParameterInit name="ns0000:JobExtraOrder">             ⎫ 801
    <psf:Value xsi:type="xsd:string">Command</psf:Value>     ⎫ 802
</psf:ParameterInit>
-<psf:ParameterInit name="ns0000:JobExtraOrderResult">       ⎫ 803
    <psf:Value xsi:type="xsd:string">A-B-C</psf:Value>       ⎫ 804
</psf:ParameterInit>
</psf:PrintTicket>
```

INFORMATION PROCESSING APPARATUS, METHOD, AND NON-TRANSITORY COMPUTER-READABLE STORAGE MEDIUM STORING PROGRAM

BACKGROUND OF THE INVENTION

Field of the Invention

The present invention relates to an information processing apparatus equipped with a printer driver, a method, and a non-transitory computer-readable storage medium storing a program.

Description of the Related Art

In a printer driver, a unique interface that is not an OS standard interface is used in order to use a function of a user interface module via an external application. A printer driver has two types of functions: "a function to change the print settings of a printer driver" and "a function not directly related to printing". A maintenance function to keep a printer in a suitable state is such an example of the latter type of function.

Recently, a new printer driver architecture called v4 has been defined. While a function allowing an external application to change the print settings of a printer driver has been included as a standard function, restrictions have been placed on the usage of a unique interface as described above and on handling a maintenance command as a print job. Hence, among the functions provided by a conventional v3 printer driver (to be referred to as a v3 driver hereinafter), it has become difficult to use "a function not directly related to printing" from an application.

Japanese Patent Laid-Open No. 2013-168017 discloses that the execution of a maintenance function in v4 architecture is possible by using a port monitor and an application closely associated with a printer driver.

SUMMARY OF THE INVENTION

An aspect of the present invention is to eliminate the above-mentioned problems with the conventional technology. The present invention provides an information processing apparatus that can execute various kinds of functions in a printer driver and implement simplification of an arrangement, a method, and a non-transitory computer-readable storage medium storing a program.

The present invention in one aspect provides an information processing apparatus that includes an application and a printer driver, comprising: a reception unit, in the application, configured to receive an instruction to execute a function which is different from printing related to the printer driver; a setting unit, in the application, configured to set the instruction received by the reception unit in a Print Ticket and transfer the Print Ticket to an OS; a calling unit, in the application, configured to call the printer driver via the OS; an obtaining unit, in the printer driver called by the calling unit, configured to obtain the Print Ticket, from the OS, in which the instruction has been set by the setting unit; and an execution unit, in the printer driver called by the calling unit, configured to execute the function based on the instruction set in the Print Ticket obtained by the obtaining unit, wherein the function is a function different from a print function.

According to the present invention, various kinds of functions in a printer driver can be executed and simplification of an arrangement can be implemented.

Further features of the present invention will become apparent from the following description of exemplary embodiments with reference to the attached drawings.

BRIEF DESCRIPTION OF THE DRAWINGS

FIG. 8 is a view showing a Print Ticket;

DESCRIPTION OF THE EMBODIMENTS

Figure 1:
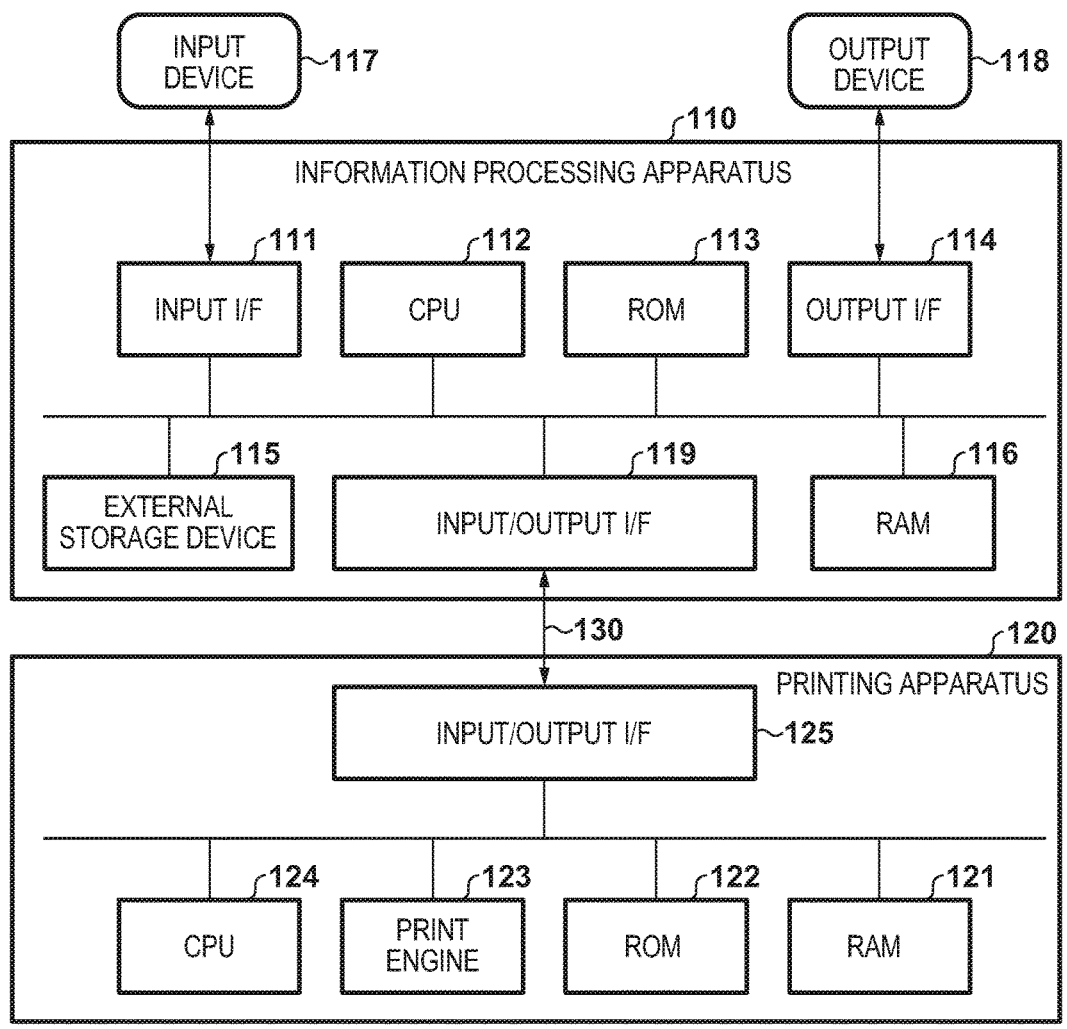
FIG. 1 is a block diagram showing the hardware arrangement of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

[Hardware Arrangement]

FIG. 1 is a block diagram showing the overall arrangement of a printing system formed by including an information processing apparatus 110 and a printing apparatus 120 connected to the information processing apparatus 110. The information processing apparatus 110 includes an input interface (I/F) 111, a CPU 112, a ROM 113, an output I/F 114, an external storage device 115, a RAM 116, an input device 117, an output device 118, and an input/output I/F 119. The ROM 113 stores an initialization program. The external storage device 115 stores programs such as an OS, a printer driver, and an application, and other various kinds of data. The RAM 116 is used as a work memory for the various kinds of programs stored in the external storage device 115. The input device 117 is formed from a touch panel, in addition to a pointing device and a keyboard. The input device is used for data input and operation instruction and connected to the input I/F 111. The output device 118 is used to perform data display and state notification and connected to the output I/F 114. The CPU 112 controls the information processing apparatus 110 in accordance with the control instructions stored in the ROM 113. For example, the processing of the flowchart of each embodiment hereinafter is, for example, implemented by the CPU 112 reading out a program stored in the ROM 113 to the RAM 116 and executing the program.

The printing apparatus 120 includes a RAM 121, a ROM 122, a print engine 123, a CPU 124, and an input/output I/F 125. The information processing apparatus 110 and the printing apparatus 120 are connected to each other via a USB cable, a network cable, or the like. The RAM 121 is used as a working memory of the CPU 124 and is also used as a temporary storage buffer for received data. The ROM 122 stores control instructions and the like. The print engine 123 performs printing based on data stored in the RAM 121. The CPU 124 controls the printing apparatus 120 in accordance with the control instructions stored in the ROM 122.

The information processing apparatus 110 and the printing apparatus 120 are communicably connected to each other via a wired or wireless network 130. Although the sharing of processes between the information processing apparatus 110 and the printing apparatus 120 has been shown in the above-described manner, the processing sharing form is not limited to this.

[Maintenance SDK Wrapper]

In this embodiment, there is prepared an application called a maintenance SDK Wrapper including a maintenance SDK and an external interface of the maintenance SDK that execute a maintenance function in place of an application which desires to use the maintenance function. A maintenance function includes functions unrelated to an actual printing operation such as the cleaning of a printhead, the position adjustment of the printhead, the printing of a nozzle check pattern, the powering-off of a power supply, and the like. An application desiring the maintenance function can execute the maintenance function via the maintenance SDK Wrapper. This makes it possible for an application desiring the execution of a maintenance function to easily execute the maintenance function, without knowing the specifications of a printing apparatus and its driver architecture, by using an API defined by a vendor.

[Maintenance Processing Procedure in v3 Driver]

Figure 2:
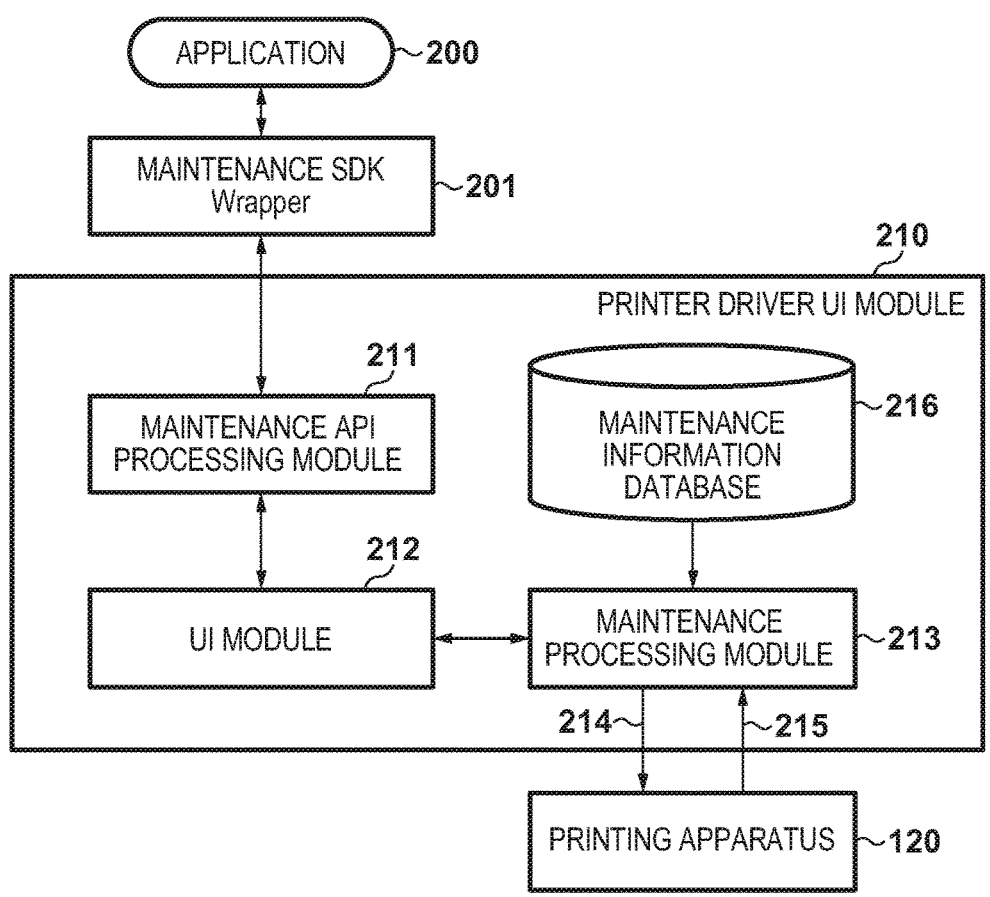
FIG. 2 is a block diagram showing a module arrangement which includes a v3 printer driver.

Here, the processing procedure of a maintenance function implemented in a v3 driver serving as the printing system will be described with reference to FIG. 2. In a printer driver UI module 210, components related to the maintenance function are a UI module 212, a maintenance processing module 213, and a maintenance information database 216. A maintenance API has been defined as an interface which is accessible from an external application and is an interface that can be accessed freely by the external application. A maintenance SDK Wrapper 201 executes the maintenance function by issuing, in accordance with an instruction from an application 200, an instruction corresponding to this instruction by using the maintenance API. A maintenance API processing module 211 issues, to the UI module 212, a maintenance command execution instruction corresponding to the instruction issued from the maintenance SDK Wrapper 201 via the maintenance API.

The UI module 212 issues, to the maintenance processing module 213, a maintenance command corresponding to the maintenance command execution instruction. The maintenance processing module 213 collates the issued maintenance command with the maintenance information database 216 and obtains a maintenance command corresponding to the printing apparatus 120 from the maintenance information database 216.

Next, the maintenance processing module 213 transmits a corresponding maintenance command 214 to the printing apparatus 120. Subsequently, after the execution of the maintenance function by the printing apparatus 120, the maintenance processing module 213 receives information 215 indicating the maintenance function execution result from the printing apparatus 120 and returns the information to the UI module 212. Finally, the UI module 212 returns the maintenance function execution result to the maintenance SDK Wrapper 201.

The processing procedure of the maintenance function on the v3 driver has been described above. The maintenance function can be easily executed by preparing a unique API in the printer driver UI module 210.

[Printing System of v4 Printer Driver]

Figure 3:
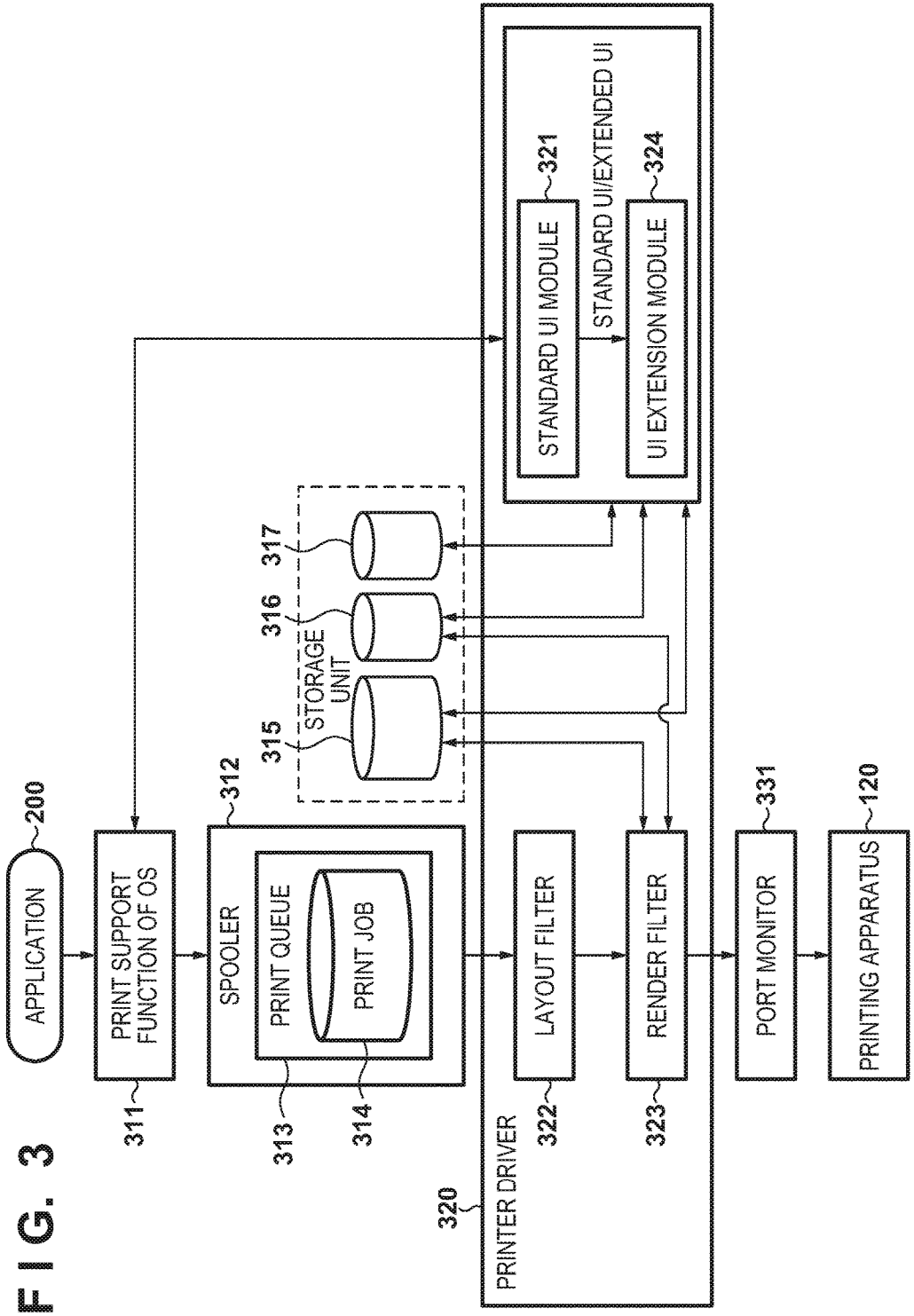
FIG. 3 is a block diagram showing a module arrangement which includes a v4 printer driver.

A printing system which uses Windows by Microsoft as the OS of the information processing apparatus 110 and a v4 printer driver using a v4 architecture as the driver architecture will be described next with reference to FIG. 3.

The application 200 includes software such as image processing, word processor, and web browser and also software that includes an I/F to another application and generates an instruction to a printer driver or a printing apparatus corresponding to a request from the other application. The application 200 issues a rendering instruction group formed from rendering instructions to the OS. The rendering instruction includes, for example, a text rendering instruction, a graphics rendering instruction, and an image rendering instruction.

The OS converts each of the various kinds of rendering instructions issued from the application 200 into spool data via a print support function 311 of the OS. The converted spool data is temporarily accumulated in a print queue 313 of a spooler 312 and managed as a print job 314 by the spooler 312. After the print job 314 is converted, by a printer driver 320, into print data analyzable by the printing apparatus 120, the converted print job is provided to the printing apparatus 120, and printing is performed in the printing apparatus 120.

Each print job 314 that has been transferred to the printer driver 320 is first processed by a layout filter 322. Here, a filter is a program (module) which has a function of outputting some kind of data by performing processes such as processing, conversion, non-conversion, generation, and the like based on the input data. Each filter is called and initialized by a filter management function (not shown) of the OS at the time of despool processing of the print job 314. The layout filter 322 performs, on the print job 314, page arrangement processing of rearranging the pages of the print job 314 or unifying a plurality of pages into a single page in accordance with the print setting information.

Next, the print job 314 is processed by a render filter 323. The render filter 323 converts the print job 314 in accordance with the print setting information and generates print data which is interpretable by the printing apparatus 120. The print data generated by the render filter 323 is then transmitted to the printing apparatus 120 via a port monitor 331.

When instructing the start of printing based on the user operation of the input device, the application 200 adds, to the print job 314, the print setting information returned from a user interface (to be referred to as a UI hereinafter) module 321 via the print support function 311 of the OS. In the v4 architecture, a Print Ticket is used to describe the print setting information. The print setting information includes, for example, the sheet size, the type of the sheet, the image processing parameters, and the like.

The UI module 321 is a module provided by the OS and its function is limited under the v4 architecture. Thus, when placed under the restriction of the v4 architecture, the printer driver 320 cannot provide, in the driver UI module, an external interface such as the maintenance API performed by the v3 driver. Hence, the application 200 cannot transfer information other than the print setting information to the UI module 321. A UI extension module 324 is a module by which a vendor can extend the function of a UI.

Each of the UI extension module 324 and the render filter 323 load and write, in a queue property bag 315 in the storage unit of FIG. 1, a value set by the UI extension module, and the queue property bag 315 stores this value. A driver property bag 316 (to be referred to as a DPB hereinafter) stores information which is dependent on the device type. A user property bag 317 stores each setting value which is dependent on the user account of the OS.

[Maintenance Processing Procedure in v4 Printer Driver]

An arrangement used to implement the maintenance processing according to this embodiment under the restriction of the v4 architecture will be described below with reference to FIG. 4.

Figure 4:
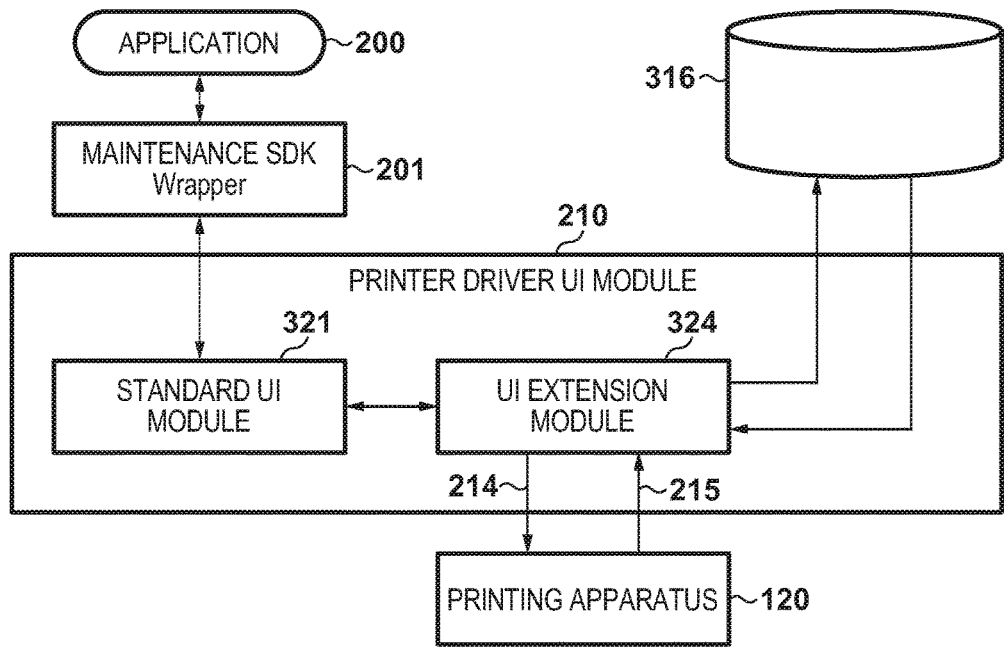
FIG. 4 is a view showing a maintenance processing procedure in a printer driver.

FIG. 4 is a view showing the arrangement for implementing the maintenance processing in this embodiment. As described above, since the UI module 321 provided by the OS is used in the v4 architecture, the maintenance SDK Wrapper 201 cannot use a unique API as in the case of the v3 driver. Hence, in this embodiment, the Print Ticket which is used to write the print setting information in the v4 architecture is extended. In this embodiment, the Print Ticket includes, as print setting information, information indicating the execution of a maintenance operation and information indicating the obtainment of a maintenance function list usable by the printing apparatus 120. This allows information other than the print setting information to be transferred to the UI module 321 and the UI extension module 324.

The application 200 transmits an instruction to the maintenance SDK Wrapper 201, and the maintenance SDK Wrapper 201 transmits a Print Ticket added with a maintenance execution instruction to the standard UI module 321 via the OS. The standard UI module 321 calls the UI extension module 324. The UI extension module 324 refers to the Print Ticket obtained from the OS and obtains the maintenance command 214 corresponding to the maintenance execution instruction from the DPB 316 which stores device dependent information such as the commands and the capabilities of the printing apparatus 120. The UI extension module 324 transmits the maintenance command 214 to the printing apparatus 120.

Note that in the v4 architecture, the access method to the DPB 316 is restricted. That is, the UI extension module 324 that has not been activated by the standard UI module 321 which has been called via the application 200, the maintenance SDK Wrapper 201, and the OS is not allowed to access the DPB 316. Hence, in this embodiment, in order to obtain information which is dependent on the printing apparatus 120 from the DPB 316, the printer driver 320 is called by using Document Properties. Then, the DPB 316 is accessed from the UI extension module 324 which has been activated by the standard UI module 321. In this manner, in this embodiment, the UI extension module 324 can use the DPB 316 to obtain and transmit, via the printer driver, a command to the printing apparatus 120. As a result, the application 200 and the maintenance SDK Wrapper 201 can execute the maintenance function of the printing apparatus 120 without knowing information, such as commands, specific to the printer driver 320 or the printing apparatus 120.

After the execution of the maintenance function by the printing apparatus 120, the UI extension module 324 receives the information 215 indicating the result of the execution of the maintenance function from the printing apparatus 120 and returns the received result to the UI module 321.

As described above, even under the restriction of the v4 architecture, it is possible to execute the maintenance function from the application 200. Detailed descriptions of the operations of this embodiment will be given below with reference to the corresponding flowcharts.

[Description of Overall Processing when Executing Maintenance Function from Perspective of Application]

Figure 5:
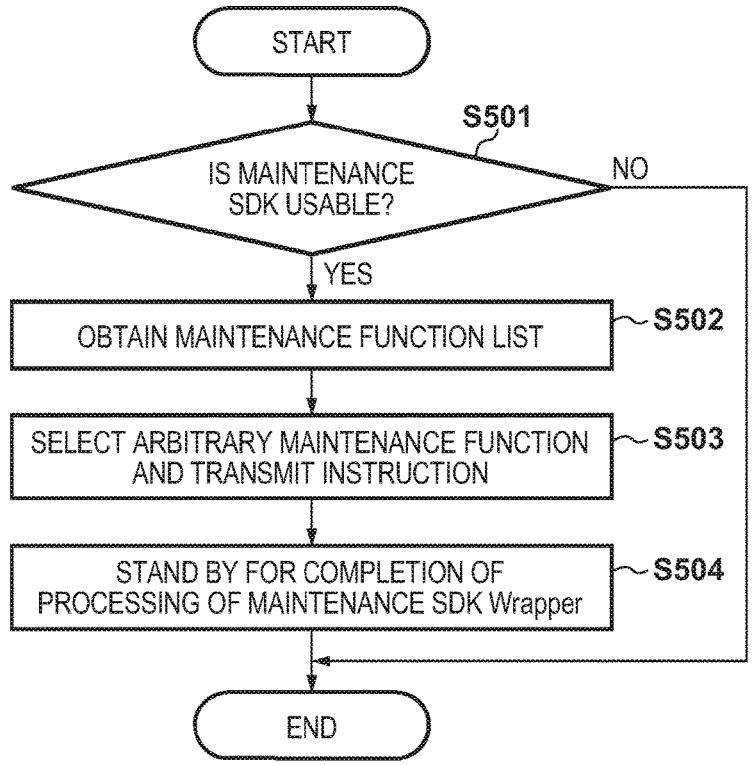
FIG. 5 is a flowchart showing the processing of an application.
Figure 6:
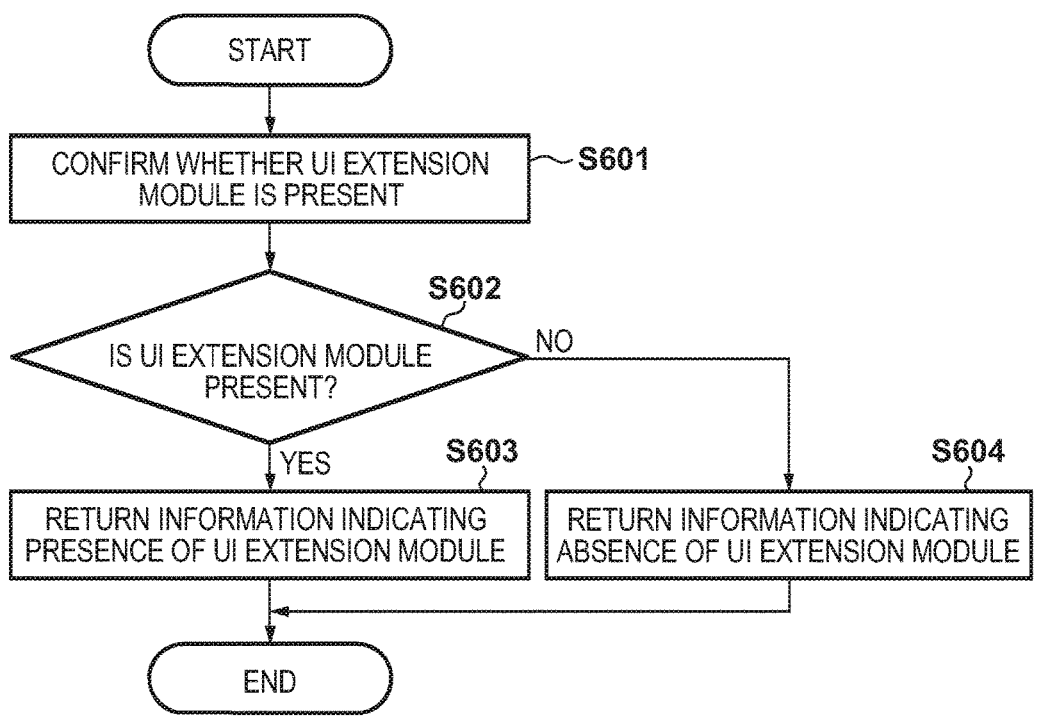
FIG. 6 is a flowchart showing the processing of a maintenance SDK Wrapper.

FIG. 5 is a flowchart showing the processing of the application 200 according to this embodiment. FIG. 6 is a flowchart showing the processing of the maintenance SDK Wrapper 201 when the application 200 makes an inquiry to the maintenance SDK Wrapper 201 to confirm whether the maintenance SDK is executable. The processing of the application 200 when the maintenance function is to be executed from the application 200 will be described.

First, the application 200 uses an OS standard API to obtain the full path of the maintenance SDK Wrapper 201 and loads the full path into the maintenance SDK Wrapper 201. Then, the application makes an inquiry to the maintenance SDK Wrapper 201 to determine whether the maintenance SDK can be used (step S501). The application 200 performs the determination after performing the processing of the maintenance SDK Wrapper 201 in FIG. 6.

A communication method including such an above-described confirmation from the application 200 to the maintenance SDK can be performed by providing an external interface such as an API in the maintenance SDK Wrapper 201. In such a case, this is performed by the application 200 issuing a predetermined confirmation request instruction.

If it is determined in step S501 that the maintenance SDK can be used, the application 200 issues, to the maintenance SDK Wrapper 201, an instruction to obtain a maintenance function list supported by the printing apparatus 120 (step S502). As a result, the restriction which does not allow the v4 printer driver to have a unique API can be avoided. On the other hand, if it is determined that the maintenance SDK cannot be used, the processing of FIG. 5 ends.

After the instruction to obtain the maintenance function list has been issued, the application 200 receives, from the maintenance SDK Wrapper 201, the maintenance function list supported by the printing apparatus 120. The application 200 selects an arbitrary maintenance function from the maintenance function list and issues, to the maintenance SDK Wrapper 201, an instruction indicating the execution of the designated maintenance function (step S503). After the processing of the maintenance SDK Wrapper 201 has been completed, the application 200 receives the execution result of the maintenance processing from the maintenance SDK Wrapper 201 (step S504), and the processing of FIG. 5 ends.

[Processing Procedure when Confirming Whether Maintenance SDK can be Used]

Next, the processing of the maintenance SDK Wrapper 201 when the application 200 makes an inquiry to the maintenance SDK Wrapper 201 to confirm whether the maintenance SDK can be executed will be described next with reference to FIG. 6. First, the maintenance SDK Wrapper 201 confirms and determines whether the UI extension module 324 is present by referring to a storage area in which the presence/absence of the UI extension module 324 has been described (steps S601 and S602).

In step S602, if it is determined that the UI extension module 324 is present, information indicating its presence is returned as a processing result to the application 200 (step S603). On the other hand, if the UI extension module is determined to be absent, information indicating its absence is returned as a processing result to the application 200 (step S604), and the processing of FIG. 6 ends. The determination of step S501 is performed using the result of FIG. 6.

[Processing Procedure when Obtaining Maintenance Function List]

Figure 7:
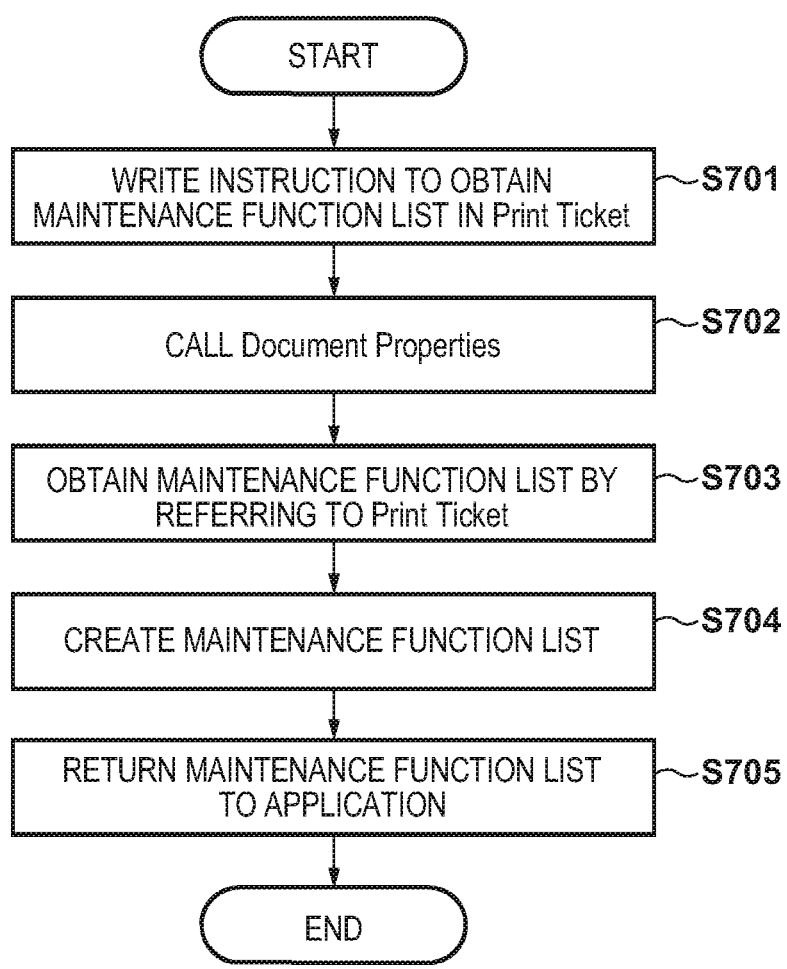
FIG. 7 is a flowchart showing the processing of a UI extension module.

The processing procedure of the maintenance SDK Wrapper 201 when the application 200 issues an instruction to obtain the maintenance function list to the maintenance SDK Wrapper 201 will be described. FIG. 7 is a flowchart showing the processing of the maintenance SDK Wrapper 201 upon receiving, from the application 200, the instruction to obtain the maintenance function list. FIG. 8 is a view showing an example of a Print Ticket in which information other than the print setting has been described and is used to obtain the maintenance function list in this embodiment.

The maintenance SDK Wrapper 201 obtains a Print Ticket from the OS. Then, the maintenance SDK Wrapper uses a tag 801 to represent the type of the instruction from the maintenance SDK Wrapper 201, sets a value representing the obtainment of the maintenance function list in a value 802, and returns the Print Ticket to the OS (step S701).

Next, the maintenance SDK Wrapper 201 calls Document Properties to call the standard UI module 321 and the UI extension module 324 via the OS (step S702). After the processing of the UI extension module 324, the maintenance SDK Wrapper 201 obtains the Print Ticket from the OS. The maintenance SDK Wrapper 201 refers to a value 804 included in a tag 803 representing the processing result of the UI extension module 324 which has been described in the Print Ticket by the UI extension module 324 and obtains the maintenance function list (step S703).

Then, the maintenance SDK Wrapper 201 creates the maintenance function list (step S704) and returns the created list as the processing result to the application 200 (step S705), and the processing of FIG. 7 ends.

The above-described Document Properties are an OS standard API, and the driver UI can only be called by this. In addition, due to the restriction of the v4 printer driver, a unique interface cannot be used as well. Accordingly, if the driver UI is to be called via the OS, the application 200 and the maintenance SDK Wrapper 201 will not be able to transfer information other than predetermined information such as the print setting to the driver UI. Hence, as described above, in this embodiment, it is possible to transfer, to the driver UI, information other than the predetermined information by including information other than the print setting information in the Print Ticket used to describe the print setting information.

Note that the value, set by the maintenance SDK Wrapper 201 to be the value 802 in the Print Ticket, representing the obtainment of the maintenance function list may be a number or a character string. In addition, the maintenance function list which is returned as a result to the application 200 may be a character string or a predetermined value. In the same manner, it is possible to prepare a plurality of types of tags in advance to serve as the tags and the values for storing a result in the Print Ticket. This allows the maintenance SDK Wrapper 201 to return an arbitrary number of results. In addition, as another method, the maintenance SDK Wrapper 201 can use some kind of a delimiter to return a plurality of values by using only a single tag. The method by which the maintenance SDK Wrapper 201 returns a result to the application 200 can be performed by using a module return value of the maintenance SDK Wrapper 201 or can be performed via an external file.

Figure 9:
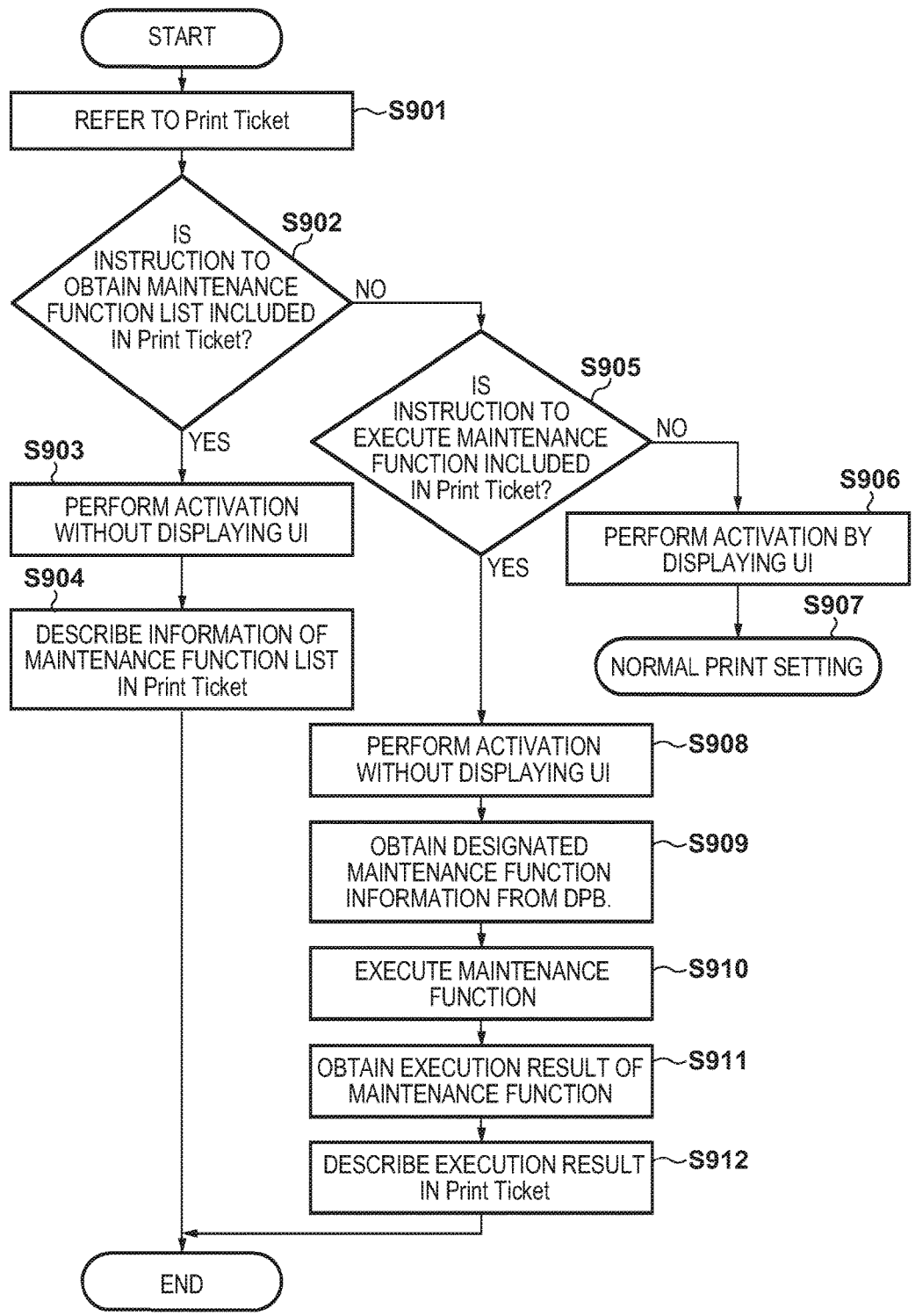
FIG. 9 is a flowchart showing another processing of the application.

The processing procedure of the UI extension module 324 performed when obtaining the maintenance function list will be described next with reference to FIG. 9.

The UI extension module 324 which has been activated by a Document Properties call refers to the Print Ticket (step S901). Next, the UI extension module confirms and determines whether the tag 801 which is the information indicating the obtainment of the maintenance function list is included in the Print Ticket (step S902). If it is determined that the Print Ticket includes the information indicating the obtainment of the maintenance function list, the UI extension module 324 is set not to be displayed (step S903), and the maintenance function list supported by the printing apparatus 120 is obtained from the DPB 316.

Neither the UI extension module 324 and the maintenance SDK Wrapper 201 nor the UI extension module 324 and the application 200 can directly access each other. Hence, the UI extension module 324 describes the obtained maintenance function list in the value 804 of the tag 803 which is a value indicating the result of the UI extension module 324 and returns the Print Ticket to the OS (step S904).

In a case in which the maintenance function list is to be obtained, display of the driver UI and user operation are unnecessary. If the UI is displayed, information unintended by the application 200 is displayed to the user and may instead invite user confusion. Hence, in this embodiment, the maintenance SDK Wrapper 201 chooses not to display the UI when it determines a case in which the maintenance function list is to be obtained so that the above-described problem can be avoided. In addition, it may also be arranged so that the UI display of the application 200 is switched in accordance with the maintenance function to be executed on the side of the application 200.

If it is determined in step S902 that the Print Ticket does not include the tag 801 which is the information indicating the obtainment of the maintenance function list, the UI extension module 324 determines whether the Print Ticket includes a maintenance function execution instruction (step S905). If it is determined that the Print Ticket does not include the maintenance function execution instruction, the UI extension module 324 is displayed (step S906) and print setting is performed (step S907). Subsequently, the processing of FIG. 9 ends. On the other hand, if it is determined that the Print Ticket includes the maintenance function execution instruction, the process advances to step S908. Processes subsequent to the process of step S908 will be described later.

A case in which the UI extension module 324 is not displayed has been described above. The v4 architecture has, as a standard function, a function not to display the UI extension module 324 by setting a non-display flag to an argument of a function when Document Properties are called. However, this non-display function has specifications not to perform the operation itself to call the UI extension module 324. Hence, when this non-display function is to be used, the UI extension module 324 can neither perform the process of step S902 nor execute the processing to obtain the maintenance function list. However, since the above-described non-display function is not used in this embodiment, it is possible to avoid the above-described problem and obtain the maintenance function list without displaying the UI extension module 324.

[Processing Procedure when Executing Maintenance Function]

Figure 10:
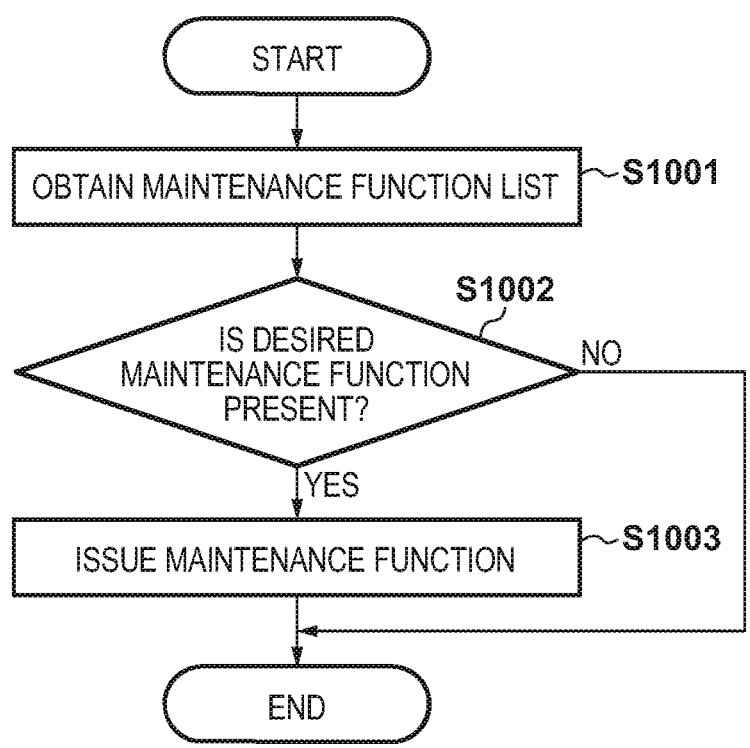
FIG. 10 is a flowchart showing another processing of the maintenance SDK Wrapper.

The processing procedure when the application 200 executes a maintenance function designated from the maintenance function list will be described. FIG. 10 is a flowchart showing the processing procedure when the application 200 obtains a maintenance function list and executes a designated maintenance function from that list.

The application 200 obtains the maintenance function list supported by the printing apparatus 120 from the maintenance SDK Wrapper (step S1001) and determines whether a desired maintenance function can be used (step S1002). If it is determined that the maintenance function is present, the application issues a maintenance function execution instruction to the maintenance SDK Wrapper 201 (step S1003). On the other hand, if it is determined that the maintenance function is absent, the processing of FIG. 10 ends. After the process of step S1003, the application 200 receives a result returned by the maintenance SDK Wrapper 201 after performing the processing of the maintenance function, and the processing of FIG. 10 ends.

Figure 11:
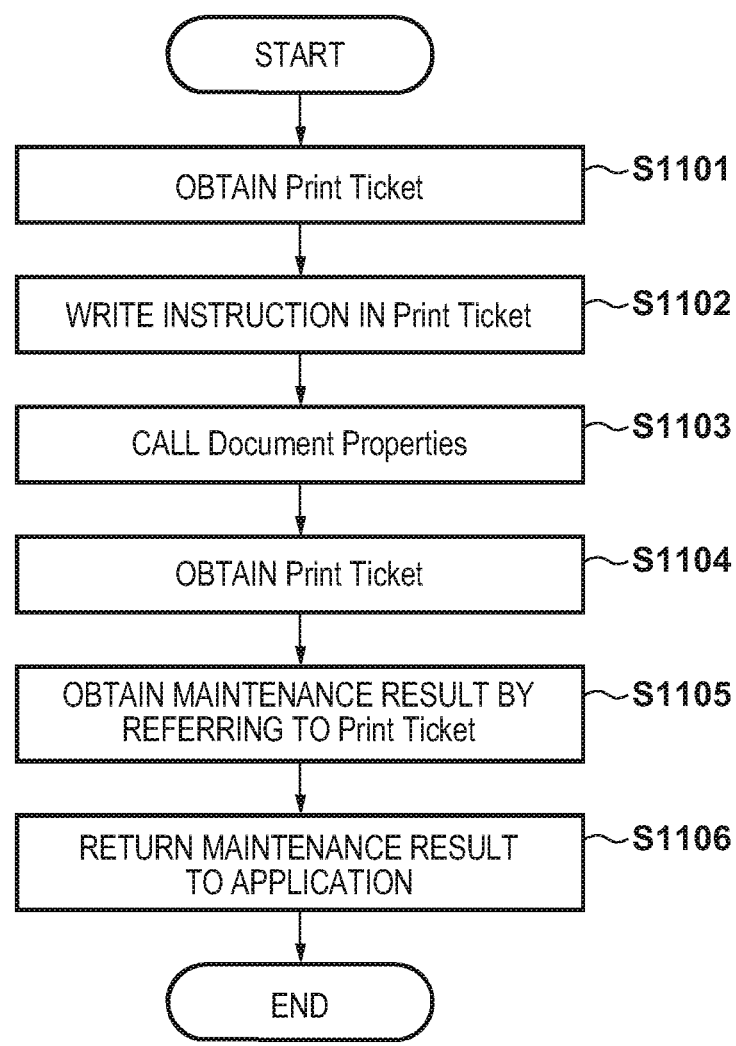
FIG. 11 is a flowchart showing another processing of the UI extension module.

The processing performed when the maintenance SDK Wrapper 201 receives an instruction to execute a maintenance function from the application 200 will be described next. FIG. 11 is a flowchart showing the processing procedure of the maintenance SDK Wrapper 201 when the maintenance SDK Wrapper 201 receives an instruction to execute the maintenance function from the application 200.

First, the maintenance SDK Wrapper 201 receives an instruction to execute a maintenance function from the application 200. Next, the maintenance SDK Wrapper 201 obtains a Print Ticket from the OS (step S1101). After describing a value corresponding to the instruction to execute the designated maintenance function in the value 802 of the tag 801 of the Print Ticket, the maintenance SDK Wrapper 201 returns the Print Ticket to the OS (step S1102).

Next, the maintenance SDK Wrapper 201 calls the Document Properties function (step S1103). After the processing of the UI extension module 324 which was called via the Document Properties function has ended, the maintenance SDK Wrapper 201 obtains the Print Ticket from the OS (step S1104). Then the maintenance SDK Wrapper refers to the value 804 of the tag 803 of the Print Ticket and obtains information indicating the success or failure of the execution of the maintenance function (step S1105). The maintenance SDK Wrapper 201 returns the information indicating the success or failure of the execution of the maintenance function to the application 200 (step S1106), and the processing of FIG. 11 ends.

The processing procedure of the UI extension module 324 activated via the standard UI module 321 when the maintenance SDK Wrapper 201 calls Document Properties for the execution of a maintenance function will be described next with reference to FIG. 9.

The UI extension module 324 refers to the Print Ticket (step S901), confirms the value 802 of the tag 801, and determines whether information indicating the obtainment of the maintenance function list is included (step S902). If it is determined that the Print Ticket does not include the information indicating the obtainment of the maintenance function list, the UI extension module 324 determines whether the Print Ticket includes information indicating the execution of a maintenance function (step S905).

If it is determined in step S905 that the Print Ticket includes the information indicating the execution of a maintenance function, the UI extension module 324 refers to the value 802 of the tag 801 as information indicating the execution of the maintenance function. Then, the UI extension module obtains, from the DPB 316, the information of the maintenance function designated by the application 200 (step S909). Next, the UI extension module 324 performs execution processing of the maintenance function designated by the application 200 based on the information of the maintenance function obtained from the DPB 316 (step S910).

In the execution processing of the maintenance function, the UI extension module 324 transmits a command indicating the execution of the maintenance function to the printing apparatus 120. To perform the transmission of the command indicating the execution of the maintenance function to the printing apparatus 120 in this case, information may be transmitted as a job or a command may be transmitted directly to the port monitor 331. Here, a command indicating the execution of the maintenance function may be held directly in the UI extension module 324 or be held in a database outside the UI extension module 324 and obtained by being collated with the information indicating the execution of the maintenance function.

In this manner, even under the restriction of the v4 architecture, arbitrary processes other than the actual printing process can be executed by the application 200 and the maintenance SDK Wrapper 201 by combining the Print Ticket and the UI extension module 324. Additionally, it becomes also possible to execute, from various kinds of applications, an arbitrary process other than the printing function by changing the execution of the maintenance function to the execution of another function.

After the process of step S910, the UI extension module 324 obtains the result of the execution of the maintenance function from the printing apparatus 120 (step S911) and returns the Print Ticket to the OS after describing the result in the Print Ticket (step S912). Subsequently, the processing of FIG. 9 ends.

Second Embodiment

In the second embodiment, points different from those in the first embodiment will be described hereinafter. In some cases, an application 200 may request the user to perform an operation on a driver UI. Since a unique interface cannot be provided in a standard UI module 321 when it is placed under the restriction of a v4 printer driver, the driver UI is displayed in a state in which a tab sheet displayed at the time of normal activation has been selected constantly. In this case, the user cannot avoid performing an operation procedure to switch the tab sheets or trace the menu layer. Hence, operations which are performed to activate a function designated by the application 200 can be burdensome of the user.

In the second embodiment, even under the restriction of the v4 printer driver, the driver UI can be presented in a state in which an arbitrary tab sheet has been opened by combining the Print Ticket and a UI extension module 324.

Figure 12:
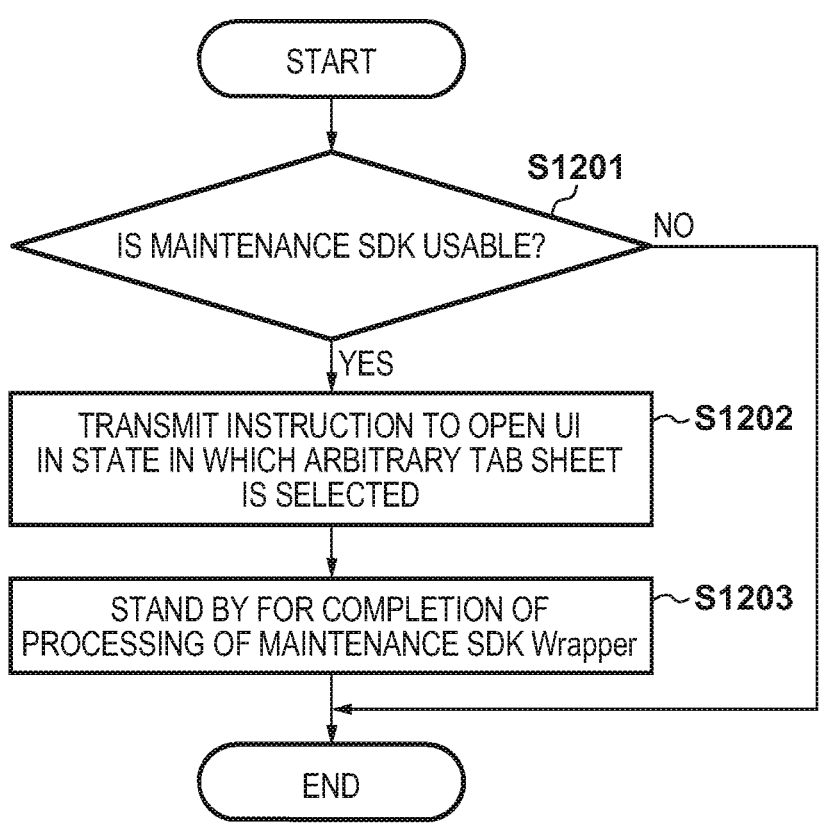
FIG. 12 is a flowchart showing the processing of an application.

The processing procedure when the application 200 activates the driver UI in a state in which an arbitrary tab sheet has been opened by the application will be described below. FIG. 12 is a flowchart showing the processing procedure of the application 200. Also, in this embodiment, a description will be given assuming that the application 200 has already completed the process of loading the maintenance SDK Wrapper 201 in step S501.

The application 200 makes an inquiry to the maintenance SDK Wrapper 201 to confirm and determine whether the maintenance SDK can be used (step S1201). If the application determines that the maintenance SDK cannot be used, the processing of FIG. 12 ends. Also, in this case, error processing may be performed by the application 200.

If it is determined that the maintenance SDK can be used, the application 200 issues, to the maintenance SDK Wrapper 201, an instruction to display the arbitrary tab sheet of the UI extension module 324 in a state in which the tab sheet has been selected (step S1202). The application 200 stands by for the completion of the processing in the maintenance SDK Wrapper 201 (step S1203). After the processing in the maintenance SDK Wrapper 201 has ended, the processing of FIG. 12 ends. Note that in this processing procedure, the application may determine whether there is a tab sheet designated by the UI extension module 324 with respect to the maintenance SDK Wrapper 201. Then, if it is determined that there is no designated tab sheet, error processing can be performed in both the side of the application 200 and the side of the maintenance SDK Wrapper 201.

Figure 13:
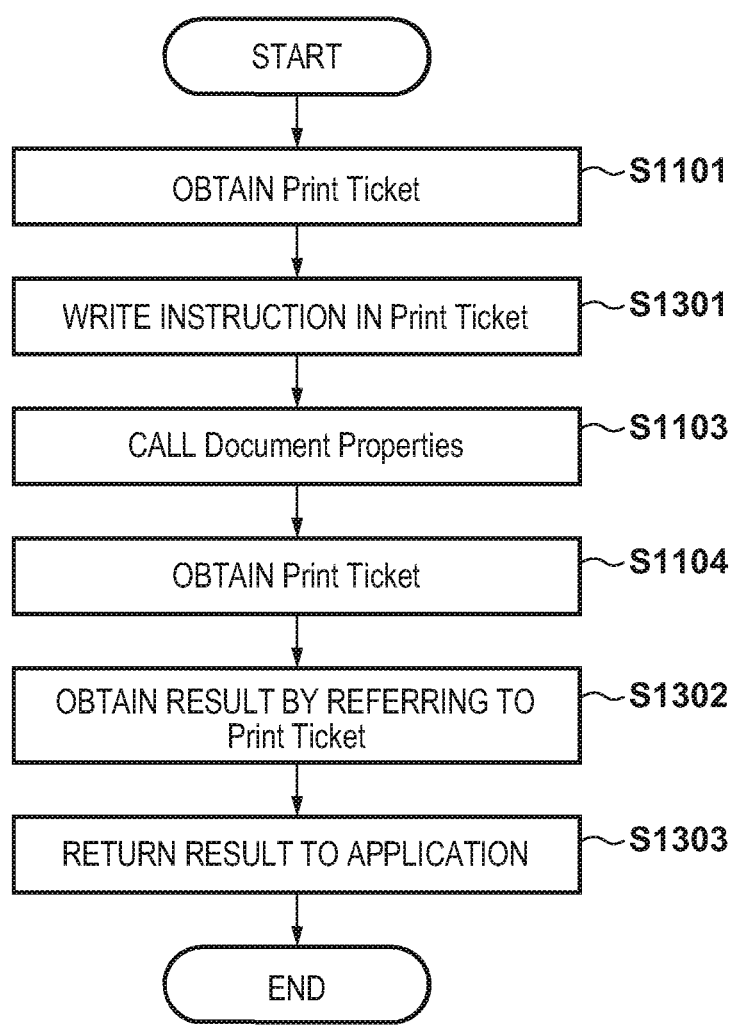
FIG. 13 is a flowchart showing the processing of a maintenance SDK Wrapper.

The processing procedure performed when the maintenance SDK Wrapper 201 receives, from the application 200, an instruction to display an arbitrary tab sheet in a selected state will be described next with reference to FIG. 13. FIG. 13 is different from FIG. 11 in terms of the following contents. That is, the contents of the result received from the UI extension module 324 via the Print Ticket after the contents written in an instruction to the Print Ticket have been changed and the contents of the result returned to the application 200 by the maintenance SDK Wrapper 201 differ from those of FIG. 11.

After the maintenance SDK Wrapper 201 receives a display instruction from the application 200, the maintenance SDK Wrapper 201 obtains the Print Ticket from the OS (step S1101 in FIG. 13). The maintenance SDK Wrapper 201 sets, as the information indicating the opening of a designated sheet which corresponds to the instruction from the application 200, a value 802 that opens the designated tab sheet as the value of a tag 801 in FIG. 8 and writes the set value in the Print Ticket (step S1301). Then, the Print Ticket is returned to the OS.

Subsequently, the maintenance SDK Wrapper 201 calls Document Properties and activates the UI extension module 324 (step S1103 in FIG. 13). After the processing of the UI extension module 324 has ended, the maintenance SDK Wrapper 201 obtains the Print Ticket from the OS (step S1104 in FIG. 13). Then, the maintenance SDK Wrapper refers to the Print Ticket and obtains a value 804 of the tag 803 as the processing result (step S1302), returns the obtained result to the application 200 (step S1303), and ends the processing of FIG. 13.

Figure 14:
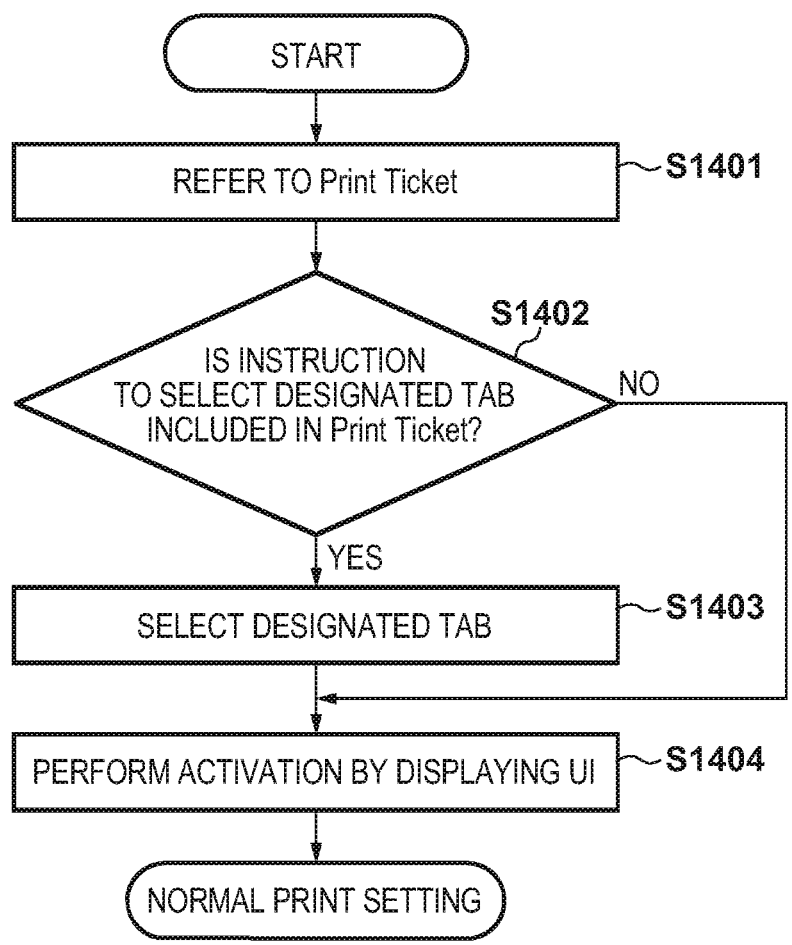
FIG. 14 is a flowchart showing the processing of a UI extension module.
Figure 15:
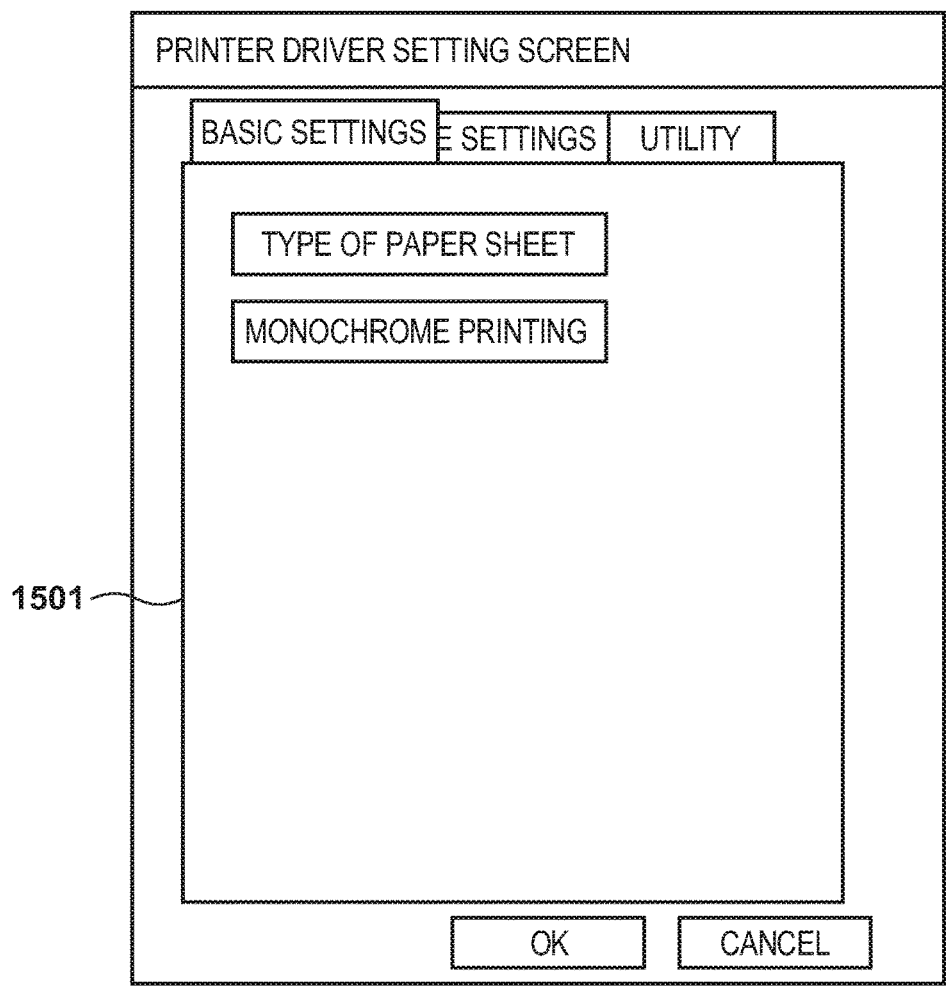
FIG. 15 is a view showing a state in which a basic setting tab sheet of the UI extension module has been selected.
Figure 16:
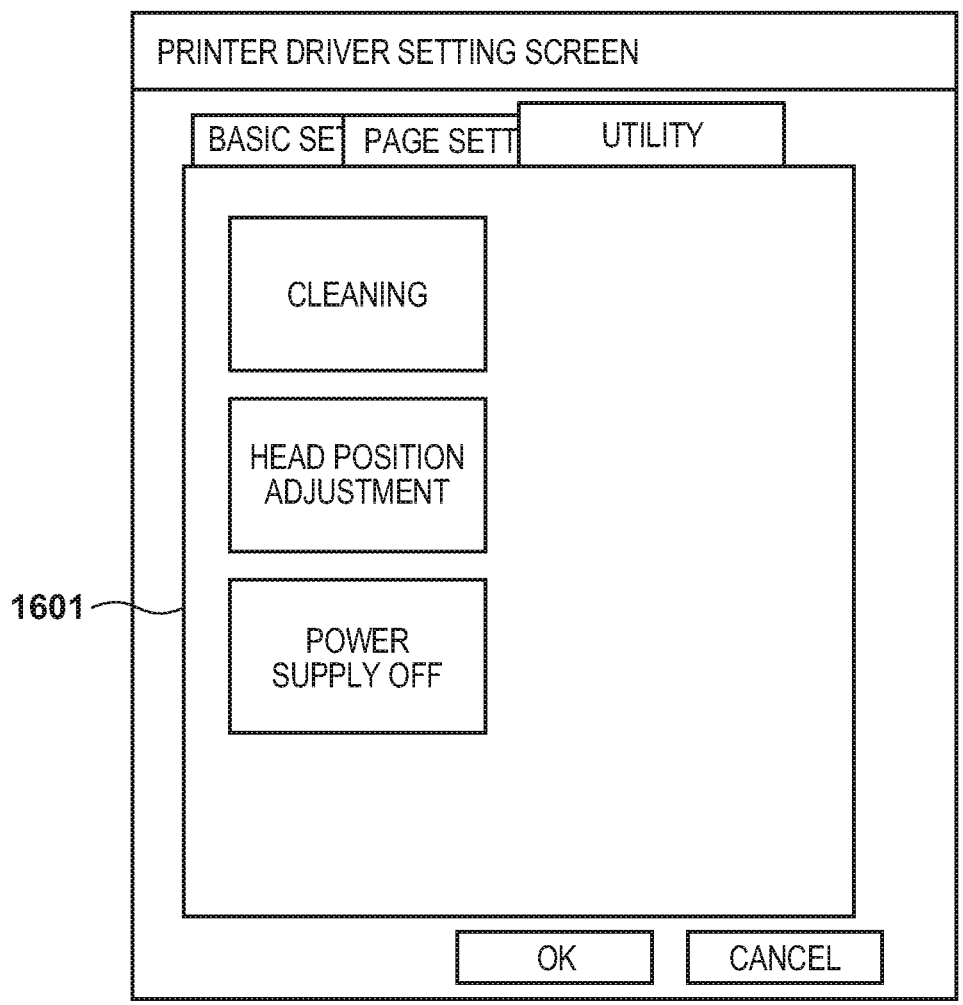
FIG. 16 is a view showing a state in which a maintenance tab sheet of the UI extension module has been selected.

The processing procedure of the UI extension module 324 when Document Properties are called from the maintenance SDK Wrapper 201 will be described next with reference to FIGS. 14, 15, and 16. FIG. 14 is a flowchart showing the processing procedure of the UI extension module 324 when the Document Properties have been called from the maintenance SDK Wrapper 201. FIG. 15 is a view showing setting screen display by the UI extension module 324 at the time of normal activation. A tab sheet 1501 is a tab sheet that is selected first at the time of normal activation. FIG. 16 is a view showing setting screen display by the UI extension module 324 in a state in which a tab sheet that is different from that at the time normal activation has been selected. A tab sheet 1601 is a tab sheet that displays the maintenance functions. The tab sheet 1601 will not be displayed in a selected state when the UI extension module 324 has been activated normally.

In a case in which the UI extension module 324 has been activated due to being called by the Document Properties, the UI extension module 324 refers to the Print Ticket (step S1401). The UI extension module 324 determines whether an instruction (to be referred to as a display instruction hereinafter) to display the UI extension module 324 in a state in which a designated tab sheet has been selected is included in the value 802 of the tag 801 in the Print Ticket (step S1402). If it is determined that the display instruction is included in the value, the designated tab sheet, for example, the tab sheet 1601 listing functions related to maintenance, corresponding to the display instruction is selected (step S1403). If it is determined that the display instruction is not included in the value, it changes to a state in which the tab sheet 1501 which is to be selected at the time of normal activation has been selected. Subsequently, in either case, the UI extension module 324 is activated to display the UI, and normal print settings are performed (step S1404). When closing the UI of the UI extension module 324, the UI extension module 324 writes the processing result in the value 804 of the tag 803 in the Print Ticket, returns the Print Ticket to the OS, and ends the processing of FIG. 14.

As described above, even under the restriction of the v4 architecture, the driver UI can be opened in a state in which an arbitrary tab sheet has been selected by combining the Print Ticket and the UI extension module 324. Therefore, the user can avoid operation procedures such as switching tab sheets and tracing the menu layer and easily access the information and tab sheet designated by the application.

Third Embodiment

In the third embodiment, points different from those of the first and second embodiments will be described next. A printing apparatus 120 may have a function to permit printing to only a user who has been pre-registered as a security measure or the like. However, since a unique API cannot be prepared under the restriction of v4 architecture, it is necessary to request the user to perform authentication processing on a driver UI. Even in this case, according to the third embodiment, communication is performed by a maintenance SDK Wrapper 201 and a UI extension module 324 via a Print Ticket. As a result, an application 200 can easily obtain, collate, and register user authentication information from the printing apparatus 120 without user operation on the driver UI.

Figure 17:
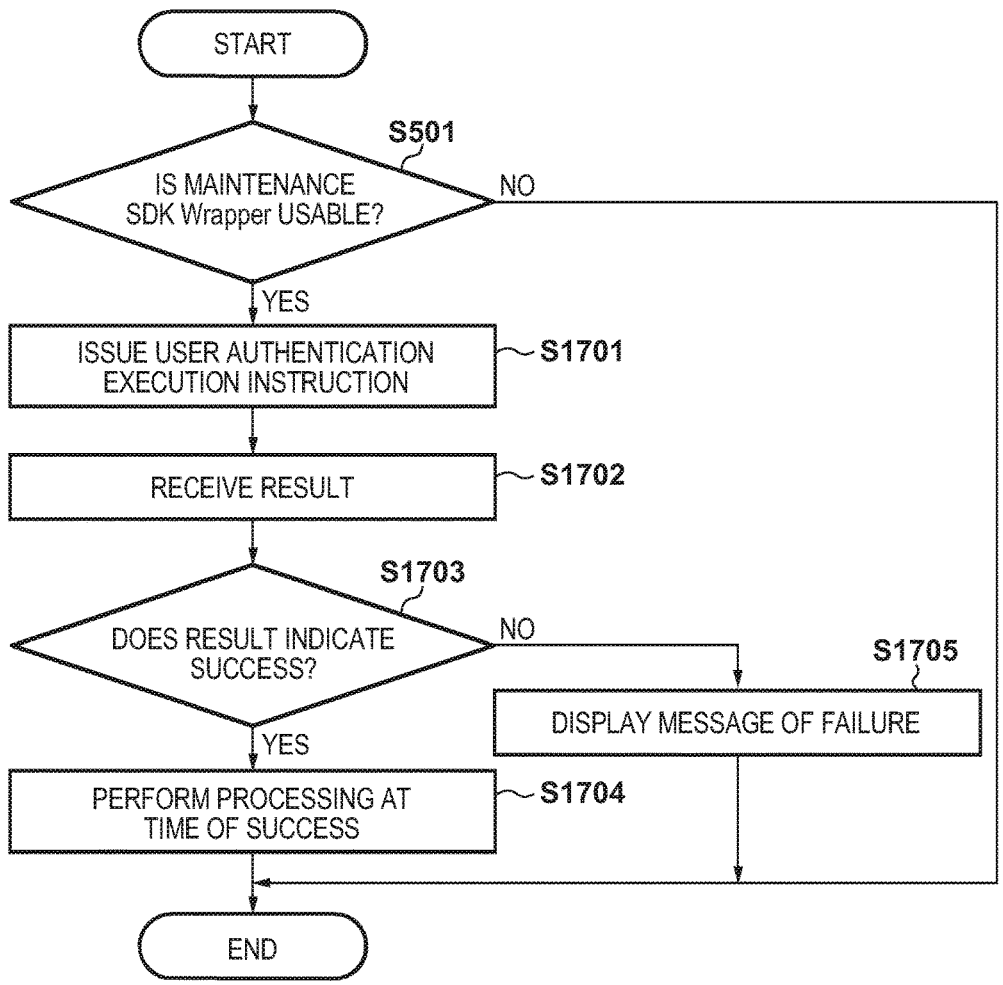
FIG. 17 is a flowchart showing the processing of an application.

The processing procedure in which the application 200 causes the printing apparatus 120 to execute a user authentication function without displaying the driver UI will be described below. FIG. 17 is a flowchart showing the processing procedure of the application 200. Additionally, in the third embodiment, a description will be given assuming that the application 200 has already completed the process of loading the maintenance SDK Wrapper 201 in step S501.

The application 200 makes an inquiry to the maintenance SDK Wrapper 201 to determine whether the maintenance SDK can be used (step S501 in FIG. 17). If it is determined that the maintenance SDK can be used, the process advances to step S1701. Otherwise, the processing of FIG. 17 ends.

The application 200 issues, together with the authentication information such as a user ID and password, a user authentication execution instruction to the maintenance SDK Wrapper 201 (step S1701). Subsequently, the application 200 receives the result of the user authentication execution processing from the maintenance SDK Wrapper 201 (step S1702). The application 200 confirms the processing result and determines whether the processing has succeeded or failed (step S1703). If it is determined that the processing has succeeded, success processing such as switching the display of the application 200 or the like is performed (step S1704). On the other hand, if it is determined that the processing has failed, error processing such as displaying an error message is performed (step S1705). After the process of step S1704 or step S1705, the processing of FIG. 17 ends.

Figure 18:
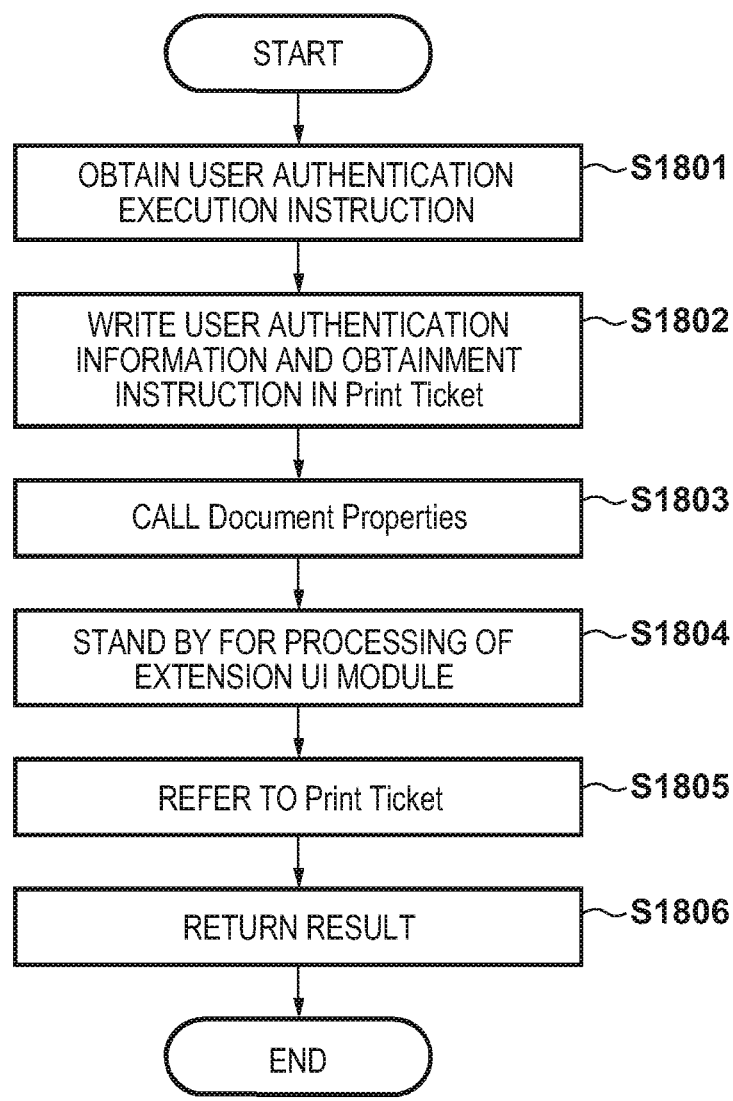
FIG. 18 is a flowchart showing the processing of a maintenance SDK Wrapper.

The processing procedure of the maintenance SDK Wrapper 201 when the application 200 issues the user authentication execution instruction to the maintenance SDK Wrapper 201 will be described next with reference to FIG. 18.

The maintenance SDK Wrapper 201 obtains the user authentication execution instruction from the application 200 (step S1801). Next, the maintenance SDK Wrapper 201 obtains the Print Ticket from the OS, describes information indicating the obtainment of the user authentication information in a value 802 of a tag 801 in the Print Ticket, and returns the Print Ticket to the OS (step S1802).

The maintenance SDK Wrapper 201 calls Document Properties and activates the UI extension module 324 (step S1803). The maintenance SDK Wrapper 201 stands by until the end of the processing of the UI extension module 324 (step S1804) and obtains the processing result from a value 804 of a tag 803 by referring to the Print Ticket obtained from the OS (step S1805). Finally, the maintenance SDK Wrapper 201 returns the processing result to the application 200 (step S1806), and the processing of FIG. 18 ends.

Figure 19:
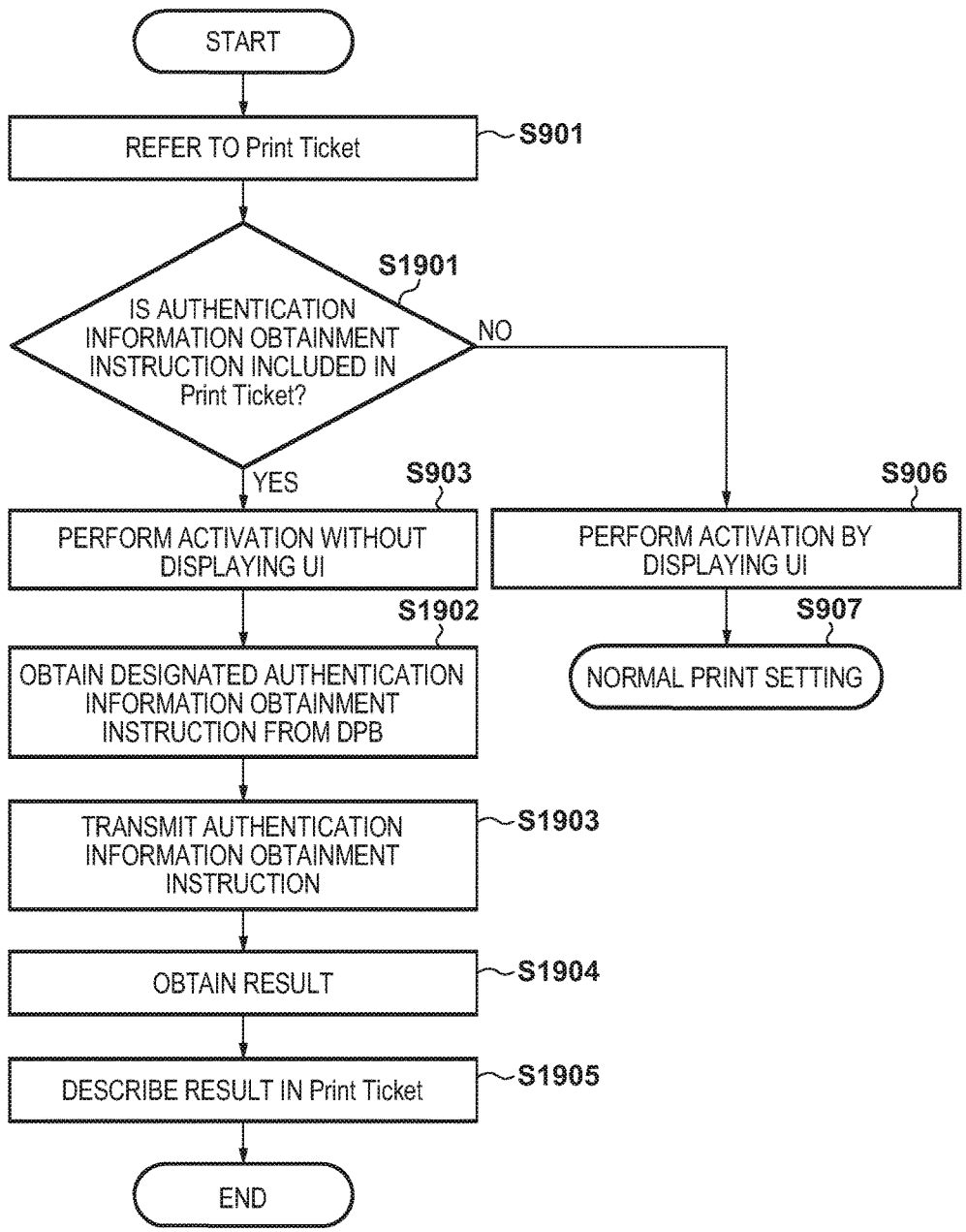
FIG. 19 is a flowchart showing the processing of a UI extension module.

The processing procedure when the UI extension module 324 is activated by a Document Properties call will be described next with reference to FIG. 19. Processes of FIG. 19 differ from those of FIG. 9 in the branching of the instruction confirmation, the instruction obtainment from a DPB 316, the instruction transmission to the printing apparatus 120, the result obtainment from the printing apparatus 120, and the describing of the result in the Print Ticket.

The UI extension module 324 refers to the value 802 of the tag 801 in the Print Ticket obtained from the OS (step S901 in FIG. 19) and determines whether a value representing an authentication information obtainment instruction is included in the Print Ticket (step S1901). If it is determined that the authentication information obtainment instruction is not included in the Print Ticket, the UI extension module displays the UI and performs normal print settings (steps S906 and S907 in FIG. 19).

If it is determined that the obtainment instruction is included in the Print Ticket, the UI extension module 324 does not display the UI (step S903 in FIG. 19) and obtains, from the DPB 316, the designated authentication information obtainment instruction corresponding to the printing apparatus 120 (step S1902). The UI extension module 324 transmits, to the printing apparatus 120, the authentication information obtainment instruction obtained from the DPB 316 (step S1903) and obtains the user authentication information as a result from the printing apparatus 120 (step S1904). The UI extension module 324 describes the obtained result in the value 804 of the tag 803 in the Print Ticket and returns the Print Ticket to the OS (step S1905), and the processing of FIG. 19 ends.

As described above, even under the restriction of v4 architecture in which a unique API cannot be set in the printer driver, communication is performed by the maintenance SDK Wrapper 201 and the UI extension module 324 via the Print Ticket. As a result, the application 200 can easily obtain, collate, and register the user authentication information from the printing apparatus 120 without user operation on the driver UI.

By using the method of writing, in the Print Ticket, information other than the print setting information in the same manner as in the aforementioned user authentication processing, the application 200 can obtain, for example, a FAX number registered in an address book of the printing apparatus 120 main body. In this manner, by describing information other than the print setting information in the Print Ticket, it is possible to obtain various kinds of information from the printing apparatus 120 via the printer driver even under the restriction of the v4 architecture in which a unique interface cannot be set.

The object of the present invention can also be achieved by the following arrangement. That is, a storage medium which stores software program codes for implementing the functions of each embodiment is supplied to a system or an apparatus, and a computer (a CPU or MPU) of the system or the apparatus can read out and execute the programs codes stored in the storage medium. In this case, the program codes read out from the storage medium implement the functions of the respective embodiments by themselves, and the storage medium which stores the program codes constitutes the present invention.

As the storage medium for supplying the program codes, for example, a flexible disk, a hard disk, an optical disk, a magneto-optical disk, a CD-ROM, a CD-R, a magnetic tape, a nonvolatile memory card, a ROM, a DVD, or the like can be used.

In addition, the functions of the respective embodiments are implemented not only when the readout program codes are executed by the computer but also when the OS running on the computer performs a part or all of actual processing on the basis of the instructions of the program codes.

Furthermore, the following arrangement can also be included. That is, the program codes read out from the storage medium are written in the memory of a function extension board inserted into the computer or a function extension unit connected to the computer. Subsequently, the CPU of the function extension board or function extension unit performs part or all of actual processing on the basis of the instructions of the program codes, and the functions of the respective embodiments are implemented by this processing.

Descriptions of command issuance for maintenance or the like, the switching of the tab display, authentication with the printing apparatus 120, and information obtainment from the printing apparatus 120 have been given above. By using the present invention, it is possible to execute a command other than a maintenance command and cause a driver to execute, from an application, many other arbitrary functions. Also, while the v4 architecture driver of Microsoft has been mainly described above, the present invention also includes a case in which the functions of the respective embodiments are implemented in another OS or architecture.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-160689, filed Aug. 18, 2016, which is hereby incorporated by reference herein in its entirety.

What is claimed is:

1. An information processing apparatus that includes an application and a printer driver, comprising:
   a processor and a memory storing a program configured to function as:
   a reception unit, in the application, configured to receive an instruction to execute a function which is different from printing related to the printer driver;
   a setting unit, in the application, configured to set the instruction received by the reception unit in a Print Ticket and transfer the Print Ticket to an OS;
   a calling unit, in the application, configured to call the printer driver via the OS;
   an obtaining unit, in the printer driver called by the calling unit, configured to obtain the Print Ticket, from the OS, in which the instruction has been set by the setting unit; and
   an execution unit, in the printer driver called by the calling unit, configured to execute the function based on the instruction set in the Print Ticket obtained by the obtaining unit,
   wherein the function is a function different from a print function,
   wherein the calling unit calls a first interface module prepared in the printer driver,
   wherein the first interface module calls a second interface module, and
   the second interface module obtains information to execute the function from a storage unit configured to store the information, and
   wherein the execution unit executes the function based on the instruction set in the Print Ticket obtained by the obtaining unit and the information to execute the function obtained by the second interface module.

2. The apparatus according to claim 1, wherein access to the storage unit from the application is disabled.

3. The apparatus according to claim 1, wherein access to the storage unit from the second interface module called by the first interface module is permitted.

4. The apparatus according to claim 1, wherein the printer driver is a v4 architecture printer driver, and
   the first interface module is a standard UI module and the second interface module is a UI extension module.

5. The apparatus according to claim 1, wherein information to execute the function is information related to a printing apparatus corresponding to the printer driver.

6. The apparatus according to claim 1, wherein the function includes at least one of an authentication function, a setting screen display function, and a maintenance function of a printing apparatus corresponding to the printer driver.

7. A method to be executed in an information processing apparatus that includes an application and a printer driver, the method comprising:
   receiving, in the application, an instruction to execute a function which is different from printing related to the printer driver;
   setting, in the application, the received instruction in a Print Ticket and transferring the Print Ticket to an OS;
   calling, in the application, the printer driver via the OS;
   obtaining, in the called printer driver, the Print Ticket, from the OS, in which the instruction has been set; and
   executing, in the called printer driver, the function based on the instruction set in the obtained Print Ticket,
   wherein the function is a function different from a print function,
   wherein a first interface module prepared in the printer driver is called,
   wherein the first interface module calls a second interface module, and
   the second interface module obtains information to execute the function from a storage unit configured to store the information, and
   wherein the function is executed based on the instruction set in the obtained Print Ticket and the information to execute the function obtained by the second interface module.

8. The method according to claim 7, wherein access to the storage unit from the application is disabled.

9. The method according to claim 7, wherein access to the storage unit from the second interface module called by the first interface module is permitted.

10. The method according to claim 7, wherein the printer driver is a v4 architecture printer driver, and
    the first interface module is a standard UI module and the second interface module is a UI extension module.

11. The method according to claim 7, wherein information to execute the function is information related to a printing apparatus corresponding to the printer driver.

12. The method according to claim 7, wherein the function includes at least one of an authentication function, a setting screen display function, and a maintenance function of a printing apparatus corresponding to the printer driver.

13. A non-transitory computer-readable storage medium storing a program for causing a computer to execute so as to
receive, in the application, an instruction to execute a function which is different from printing related to printer driver;
set, in the application, the received instruction in a Print Ticket and transfer the Print Ticket to an OS;
call, in the application, the printer driver via the OS;
obtain, in the called printer driver, the Print Ticket, from the OS, in which the instruction has been set; and
execute, in the called printer driver, the function based on the instruction set in the obtained Print Ticket,
wherein the function is a function different from a print function,
wherein a first interface module prepared in the printer driver is called,
wherein the first interface module calls a second interface module, and
the second interface module obtains information to execute the function from a storage unit configured to store the information, and
wherein the function is executed based on the instruction set in the obtained Print Ticket and the information to execute the function obtained by the second interface module.

* * * * *